INVENTOR
Herbert Sixsmith
BY
David Gabbins
ATTORNEY

Dec. 21, 1965   H. SIXSMITH   3,224,818
COMBINED ELECTROMAGNETIC AND ELECTROMECHANICAL POWER CONVERTER
Filed Dec. 10, 1962   5 Sheets-Sheet 2

INVENTOR
Herbert Sixsmith
BY
David Robbins
ATTORNEY

Dec. 21, 1965 H. SIXSMITH 3,224,818
COMBINED ELECTROMAGNETIC AND ELECTROMECHANICAL POWER CONVERTER
Filed Dec. 10, 1962 5 Sheets-Sheet 3
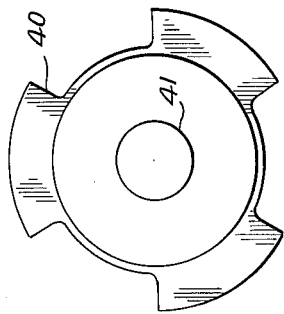
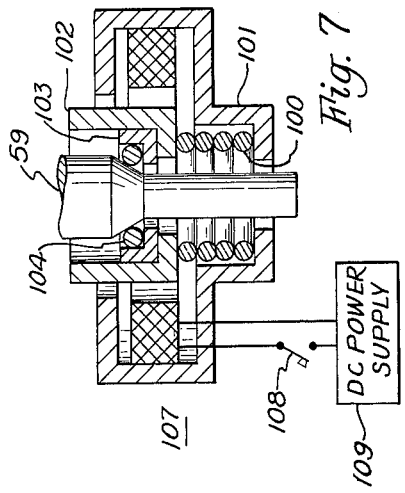
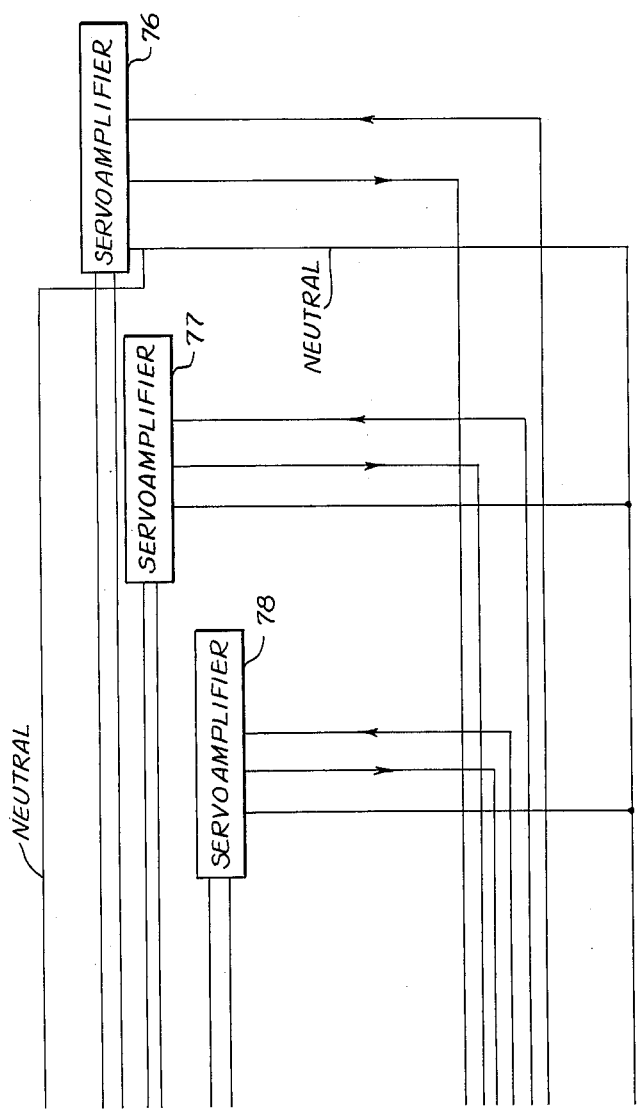
INVENTOR
*Herbert Sixsmith*
BY
*David Gobbins*
ATTORNEY

NOTE:
FOR A COMPLETE
DEVELOPEMENT OF THE
STATOR WINDINGS, SEE FIG. 5

United States Patent Office

3,224,818
Patented Dec. 21, 1965

3,224,818
COMBINED ELECTROMAGNETIC AND ELECTRO-
MECHANICAL POWER CONVERTER
Herbert Sixsmith, Boulder, Colo., assignor to the United
States of America as represented by the Secretary of
Commerce
Filed Dec. 10, 1962, Ser. No. 243,681
18 Claims. (Cl. 308—10)

This invention relates to a combined electromagnetic bearing and electro-mechanical power converter.

Electromagnetic bearings may be used advantageously where the rotor of an electric motor or generator must be supported in a vacuum or in a range of temperatures that extends from, say, absolute zero to 600° K. Further, a rotor supported by electromagnetic bearings can be run at extremely high speeds since there are no viscous effects which result from the use of a lubricant.

Instead of the conventional configuration with two electromagnetic bearings, one at each end of the rotor, certain advantages result from combining the functions of the bearings and the converter in a single unit. These include a saving in space. Higher speeds may be obtained since a shorter shaft may be used, and the unit as a whole is simplified since two rotors may be used instead of three.

Accordingly, it is a principal object of the present invention to provide a unit wherein the elements cooperate to perform the functions of a power converter as well as electromagnetic bearings. This is accomplished, in part, by positioning the windings of the converter and bearings on a stator in such a manner that their mutual inductance is substantially zero.

In one embodiment, each bearing comprises several sensor and control windings positioned around a stator of a motor. The magnitude of the current in each control winding is dependent upon the self-inductance of an associated sensor winding which, in turn, is determined by the position of the rotor relative to the stator. The current in the control windings establishes electromagnetic fields which exert forces that maintain the rotor suspended in the stator.

To maintain the location of the shaft of the motor in an axial direction, a rotor is positioned on each end of the shaft and in an associated stator holding the windings just described. This arrangement controls the axial motion of the shaft in a fashion similar to a solenoid controlling the axial motion of an iron core.

The control and sensor windings are positioned on each stator relative to each other in such a manner that the mutual inductance between each sensor and a respective control winding is substantially zero. Further, the mutual inductance between the motor and bearing windings, because of their relative positions, is substantially zero. These two groups of windings therefore utilize the same rotor and stator in performing their respective functions without establishing electromagnetic fields that interfere with each other.

In another embodiment, described below, each phase of a voltage source is applied to a respective motor-control winding to drive the shaft of the motor. To control the radial and axial position of the shaft, the magnitude of each phase is modulated in dependency upon the self-inductance of an associated sensor winding.

In the figures:

FIG. 3 is an end view of a rotor that may be used in the first or second embodiment;

Figure 5:
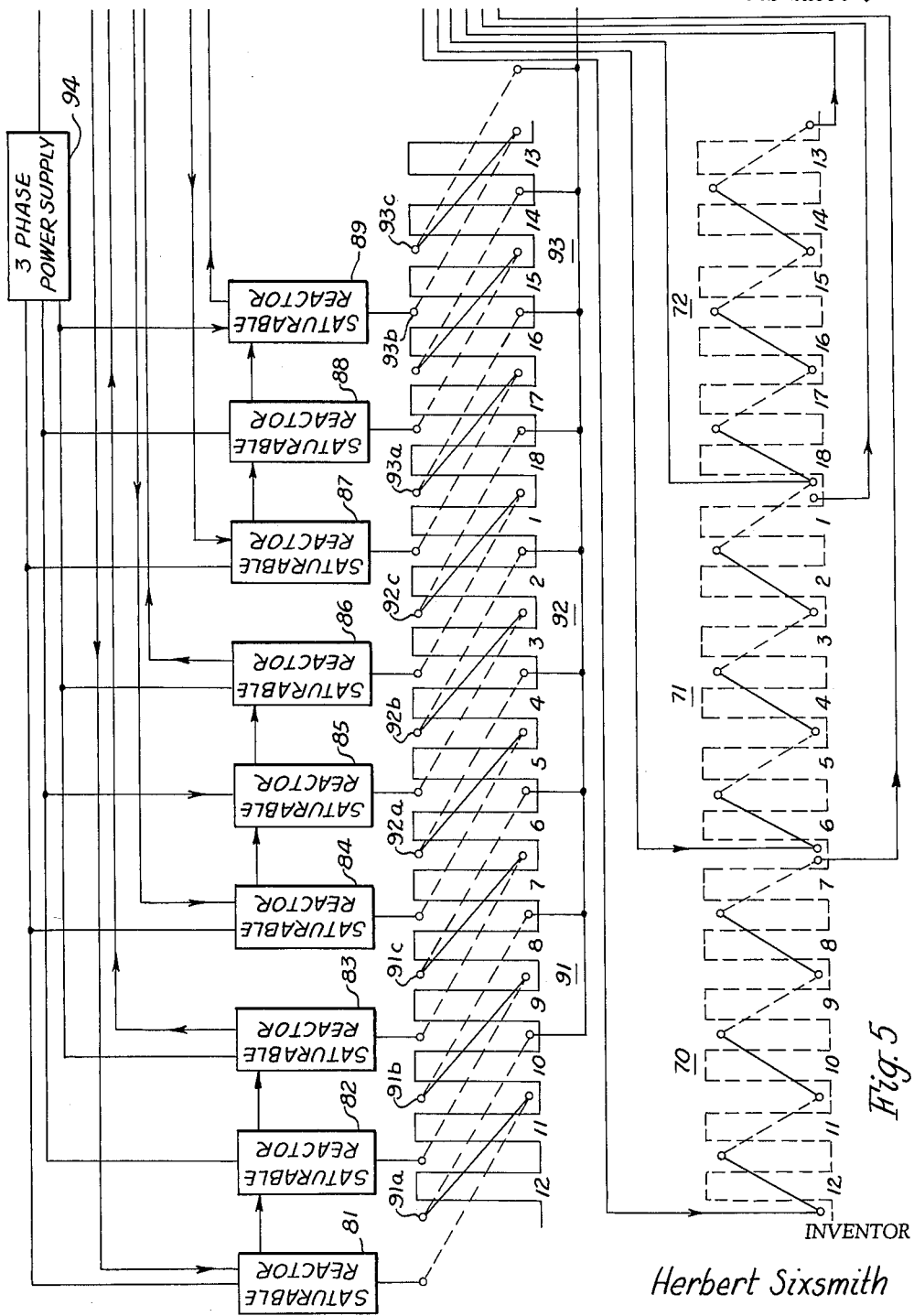

FIGS. 5 and 6 include a development of the windings and associated circuits used in the second embodiment; and FIG. 7 illustrates a shaft-supporting device that may be used in the second embodiment of the present invention.

Throughout the figures, the small circles represent windings in slots, while the end connectors in front of and behind the poles are represented as solid and dotted lines, respectively.

Figure 2:
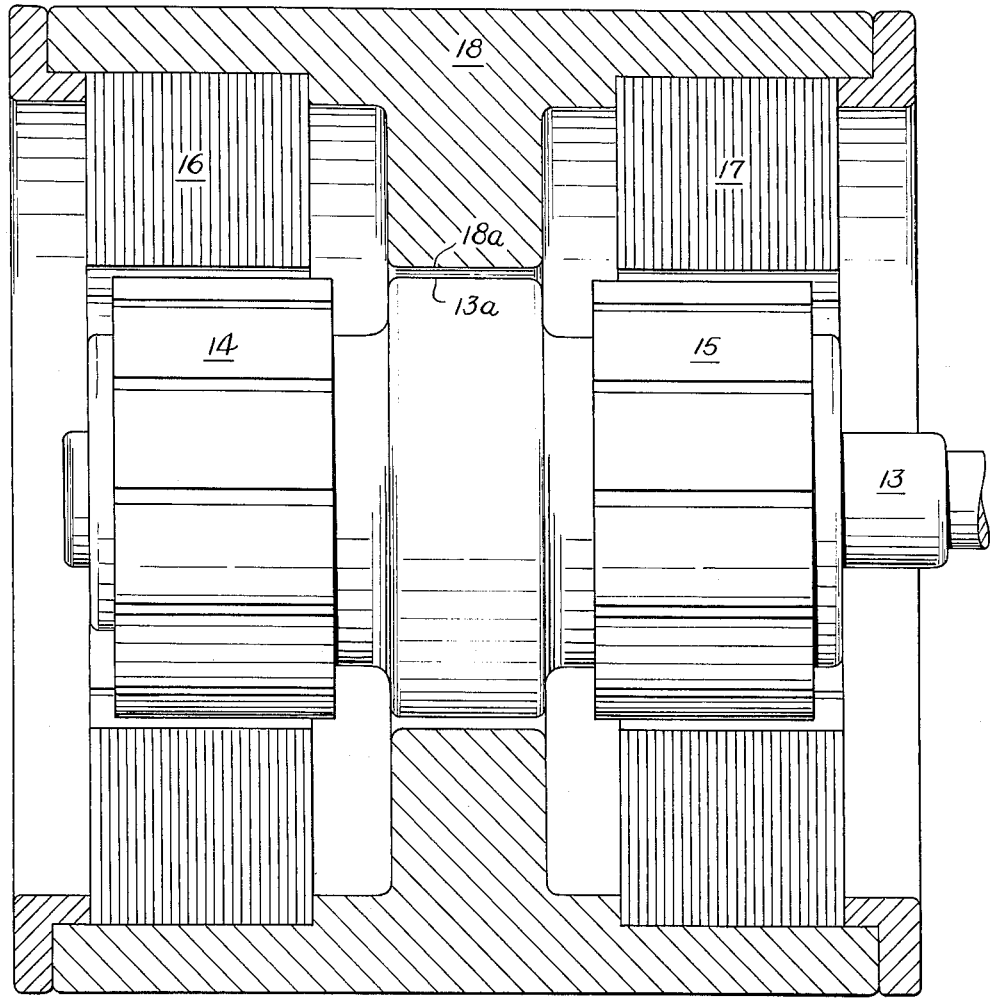
FIG. 2 is a top view of the first embodiment.

With reference to FIG. 2, shaft 13 supports laminated rotors 14 and 15 which are magnetically suspended within the corresponding laminated stators 16 and 17. The stators are mounted in housing 18 by suitable means, not shown. Projections 13a and 18a, located on shaft 13 and housing 18, respectively, form a magnetic shunt whose function will be apparent from the description below.

It will be noted that rotors 14, 15 have substantially the same width as stators 16, 17 and that the axial distance between the centers of the rotors is shorter than the axial distance between the centers of the stators. The rotors are therefore "symmetrically misaligned" relative to the stators. The distance, for example, between the planes drawn through the left ends of stator 16 and rotor 14 is substantially equal to the distance between planes drawn through the right ends of stators 17 and rotor 15.

Although FIG. 2 discloses one embodiment, it is not essential to the inventive concept that rotors 14, 15 be "symmetrically misaligned" relative to stators 16, 17. The rotors, for example, could have the same width as the stators and could be positioned in the stators in such a manner that the right end of each rotor lies in the same plane as the right end of its associated stator. The rotors and stators are then "aligned."

Figure 1:
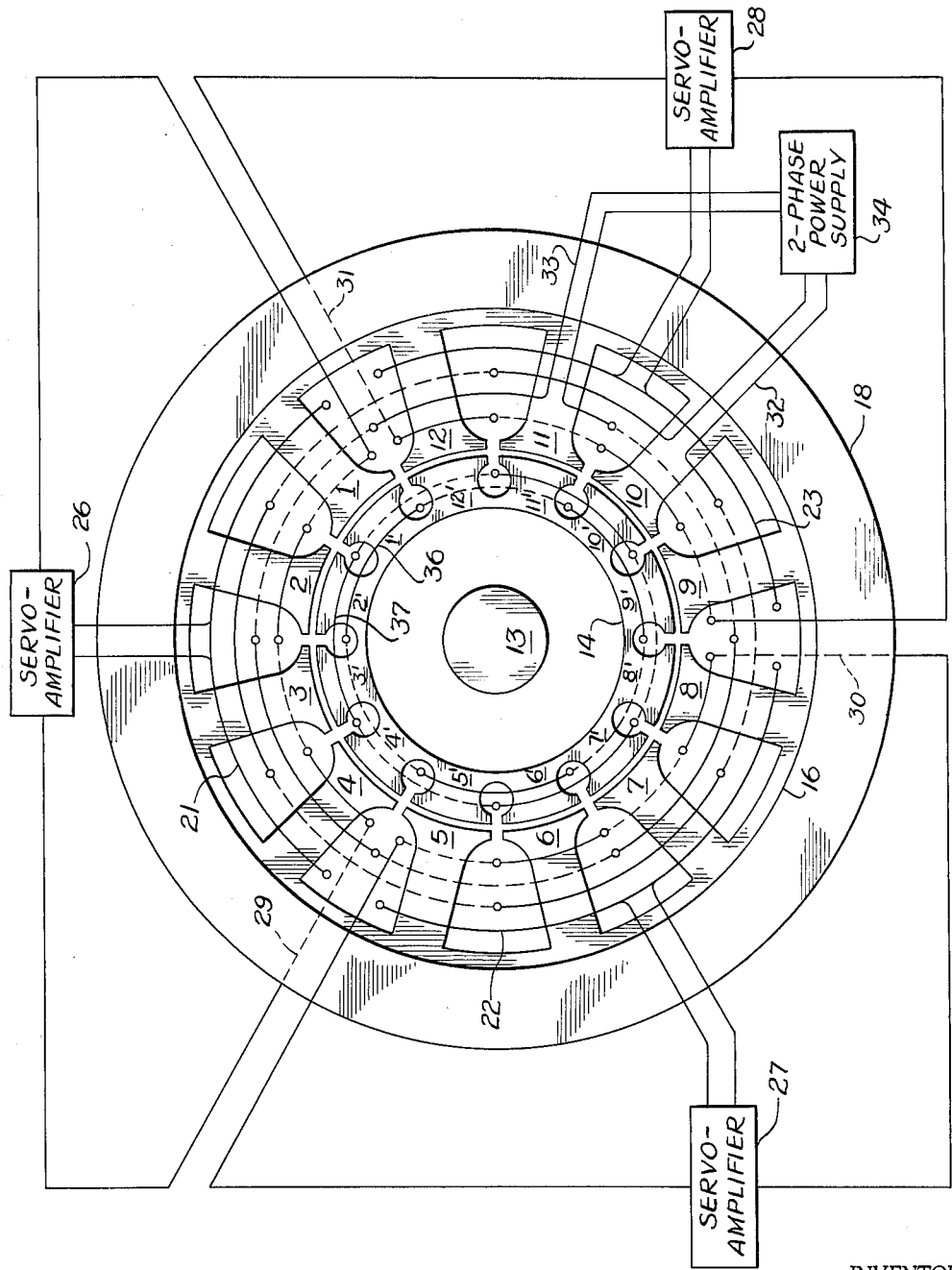
FIG. 1 is an end view of a first embodiment of the present invention.

With reference to FIG. 1, control windings 21 to 23 are each looped around a respective group of poles 1 to 4, 5 to 8, and 9 to 12. Hence, each group of poles is of the same polarity, and the polarity depends upon the direction of current flow through the associated winding. Each control winding is connected across the output of a respective one of the servo amplifiers 26 to 28. The servo amplifiers employed are well known in the art and may be similar in construction to the one shown in FIG. 2 of U.S. Patent No. 2,733,857, issued February 7, 1956, to Jesse W. Beams.

Sensor winding 29 is wound on stator 16 and passes alternately behind and in front of poles 1 to 4. Likewise, sensor winding 30 is wound alternately around poles 5 to 8 and sensor winding 31 alternately around poles 9 to 12. Thus, alternate poles on stator 16 are of the same polarity. Each of the sensor windings is connected to an input of a respective one of the servo amplifiers 26 to 28.

It is apparent that the self-inductance of a sensor winding, say 29, is increased or decreased as rotor 14 moves closer or further away from the winding under consideration. The output of servo amplifier 26 is dependent upon the inductance of sensor winding 29 and is adjusted so that when rotor 14 moves closer to the sensor winding, the current in control winding 21 decreases, and when the rotor moves away from the sensor winding, the current in the control winding increases.

Motor winding 32 is wound on stator 16, and starting with poles 10 and 11 passes alternately in front of and then behind pairs of poles. Similarly, motor winding 33 is wound on stator 16, and starting with poles 11 and 12 passes alternately in front of two poles and behind two poles. Thus, the motor windings are positioned on the stator in a 2-phase, 6-pole configuration. Two-phase power supply 34 provides two voltages, displaced by 90°; one voltage is applied to each of windings 32, 33.

The mutual inductance between motor windings 32, 33, sensor winding 29, and control winding 21 is substantially zero. Likewise, the mutual inductances between the motor windings, sensor winding 30 and control winding 22, and between the motor windings, sensor winding 31 and control winding 23 are substantially zero.

This can be most easily understood by referring to poles 1 to 4. Motor winding 33 passes behind poles 1, 2 and in front of poles 3, 4, while motor winding 32 passes behind pole 1, in front of poles 2, 3 and behind pole 4. Because of the symmetry of the motor windings, the electromagnetic fields established by current flow in these windings are of such a polarity that the currents induced in control winding 21 cancel out. For the same reason, the fields established by current flow in control winding 21 create currents that cancel out in the motor windings. The same relationships exist between sensor winding 29 and the motor windings and between the sensor winding and control winding 21.

Rotor 14 is provided with windings 36 and 37, which are positioned in a 6-pole, 2-phase configuration. These windings must be insulated from the rotor in order to prevent induction of currents in the rotor as a result of interaction with the fields established by control windings 21 to 23 and sensor windings 29 to 31. In the present embodiment, the terminals of each rotor winding 36, 37 are short-circuited on themselves. In large motors, however, the rotor windings may be brought out to sliprings so that additional resistances may be included in the rotor circuit for starting purposes.

The mutual inductance between rotor winding 36 or 37, control windings 21 to 23 and sensor windings 29 to 31 is substantially zero. In FIG. 1, for example, control winding 21 passes over poles 1 to 4, while sensor winding 29 passes alternately behind and in front of the same poles. Rotor winding 36 is wound in front of poles 1', 2' and behind poles 3', 4', and rotor winding 37 is wound behind pole 1', in front of poles 2', 3' and behind pole 4'. Thus, the flux established by the rotor windings induces currents that cancel out in the control and sensor windings; and the flux established by the latter windings induces currents in the rotor windings that cancel out.

Returning to FIG. 2, stator 17 and rotor 15 are substantially identical to stator 16 and rotor 14, respectively. The former stator and rotor support the same number of windings in the same configuration as the latter, which are shown in detail in FIG. 1. Rotor 15 supports rotor windings 36a, 37a in the same way windings 36, 37 are supported in FIG. 1. Stator 17 holds sensor windings 29a to 31a, each tied to an input of a respective servo amplifier 26a to 28a. Stator 17 also holds control windings 21a to 23a, each tied to an output of one of the amplifiers. Finally, motor windings 32a, 33a, positioned on stator 17 in a 2-phase, 6-pole configuration, are each connected to a respective output of power supply 34.

In operation, the servo amplifiers 26 to 28 and 26a to 28a are adjusted by techniques that will be apparent to one skilled in the art until shaft 13 is centrally suspended within stators 16 and 17. Power supply 34 is then applied to motor windings 32, 33, 32a and 33a, and a revolving field is established that induces voltages in rotor windings 36, 37, 36a and 37a. Currents flow in the rotor windings, as a result of these voltages, and a torque is produced which brings the motor up to speed.

As shaft 13 revolves, due to its speed of rotation, it may be displaced from its initial, central position in stators 16, 17. When this occurs, electromagnetic forces, established by current flow in control windings 21 to 23, restore the shaft to its initial position.

As an example, assume that rotor 14, shown in FIG. 1, is displaced downwards, thus increasing the air gap between poles 1' to 4' and stator 16. The self-inductance of sensor winding 29 is decreased, and servo amplifier 26 responds by increasing the current through control winding 21. The corresponding increase in the electromagnetic field increases the force applied to the rotor in the upward direction. At the same time, the self-inductance of each sensor winding 30, 31 is increased and the current through control windings 22, 23 is decreased, diminishing the force applied to the rotor in the downward direction. The resultant of the forces applied to the rotor is therefore in the upward direction and has a magnitude such that the rotor is restored to its initial position.

To maintain the position of shaft 13 in an axial direction, rotors 14 and 15 are "symmetrically misaligned" relative to stators 16 and 17 (FIG. 2). This arrangement functions in a manner similar to a solenoid having an iron core. When, for example, shaft 13 is moved to the right, the area of the gap facing sensor windings 29 to 31 is reduced, lowering the inductance of the sensor windings and increasing the current in control windings 21 to 23 on stator 16. Simultaneously, the area of the gap facing sensor windings 29a to 31a is increased, reducing the current in control windings 21a to 23a on stator 17. Since the magnetic field established by control windings 21 to 23 is increased and the field established by windings 21a to 23a is decreased, shaft 13 is moved to the left and restored to its initial position.

If rotors 14, 15 and stators 16, 17 were "aligned," an axial displacement of shaft 13 in either direction would cause a reduction in the active pole face area, and the attraction between the poles would generate, solenoid-wise, a restoring force. Servo amplifiers 26 and 28 need not respond to an axial displacement of the shaft. However, a finite response of the servo amplifiers will change the mean strength of the radial field in each rotor, and this will change the magnitude of the restoring force, but will not affect the axial stability.

It should be noted that projections 13a, 18a form a magnetic shunt which passes the flux created by current flow in the control windings.

Instead of sensor windings 29 to 31, the position of rotor 14 relative to stator 16 could be sensed by three stationary, electrostatic probes positioned 120° apart, around frame 18, and to the left of stator 16 in FIG. 2. Each probe comprises an insulated electrode situated close to the surface of a ring, not shown, connected to the left side of rotor 14, as viewed in FIG. 2. The capacity between each electrode and the ring forms part of the tuning capacity of a tuned circuit in a servo amplifier whose output may be applied to a respective one of control windings 21 to 23. The amplifiers may be adjusted so that an increase or decrease in the gap between stator 16 and rotor 14 will result in increased or decreased current flow through the associated control winding. Thus, the magnitude of current applied to each control winding is dependent upon the position of rotor 14 relative to stator 16.

To control the position of shaft 13 in an axial direction, three additional stationary, electrostatic probes may be positioned 120° apart, around frame 18, and to the right of stator 17. Each probe includes an insulated electrode positioned close to the surface of a ring, not shown, connected to the right side of rotor 15. The probes cooperating with the ring on rotor 15 are connected in an arrangement substantially the same as the one just described in connection with the probes cooperating with the ring on rotor 14, except that the output of the servo amplifiers are applied to control windings 21a to 23a. Each probe is axially misaligned relative to its associated ring in the same manner as the rotor to which the ring is attached is axially misaligned relative to its stator.

If rotors 14, 15 and stators 16, 17 are "aligned," the rings attached to each rotor are extended beyond the stationary probes in the axial direction so that the response of servo amplifiers 26 and 28 to displacement of shaft 13 in the axial direction is substantially zero. A finite response by the servo amplifiers, however, will change the magnitude of the restoring force and will not affect the axial stability.

For the particular servo amplifier and probe that may be used, reference is made to an article by Herbert Sixsmith entitled "Electromagnetic Bearing" in the Review of Scientific Instruments, vol. 32, pp. 1196–1197, November 1961.

If a polyphase induction motor is driven above its synchronous speed, it will act as a generator and supply power to the line. It is therefore understood that the embodiment disclosed in FIG. 1 could be used as an A.C. induction generator, provided the necessary driving force is applied to shaft 13 and an external source of 2-phase voltage supplies a magnetizing current. In cases where the latter is impractical, the salient pole rotor 40 shown on the shaft 41 in FIG. 3 may be employed.

It is also understood that the principles of the present invention could be used in a motor having more than two phases. If, for example, a 3-phase motor were to be constructed, it would have 18 poles and 3 motor windings on the stator. However, the rotor could have 12 poles accommodating a 2-phase winding or 18 poles accommodating a 3-phase winding.

In another configuration, a rotor could be supported by two servo amplifiers which control the position of the shaft along two diameters, mutually at right angles. In this case, a thrust bearing is required to maintain the axial location of the shaft.

A steady biasing flux may be provided by a coil positioned between stators 16 and 17 in FIG. 2. When such a flux is employed, the three control windings on each of the stators may be wound according to the arrangement used in a conventional 2-pole, 3-phase motor.

The second embodiment, disclosed in FIGS. 4 to 7, comprises a shaft 59, supporting two laminated rotors 60, 61 which are magnetically suspended within the corresponding laminated stators 62, 63. The physical relationships between shaft 59, rotors 60, 61 and stators 62, 63 are essentially the same as that shown for shaft 13, rotors 14, 15 and stators 16, 17 in the embodiment disclosed in FIG. 2. For this reason, the relationships between the shaft, rotors, and stators in the second embodiment are not repeated in the drawings.

Figure 4:
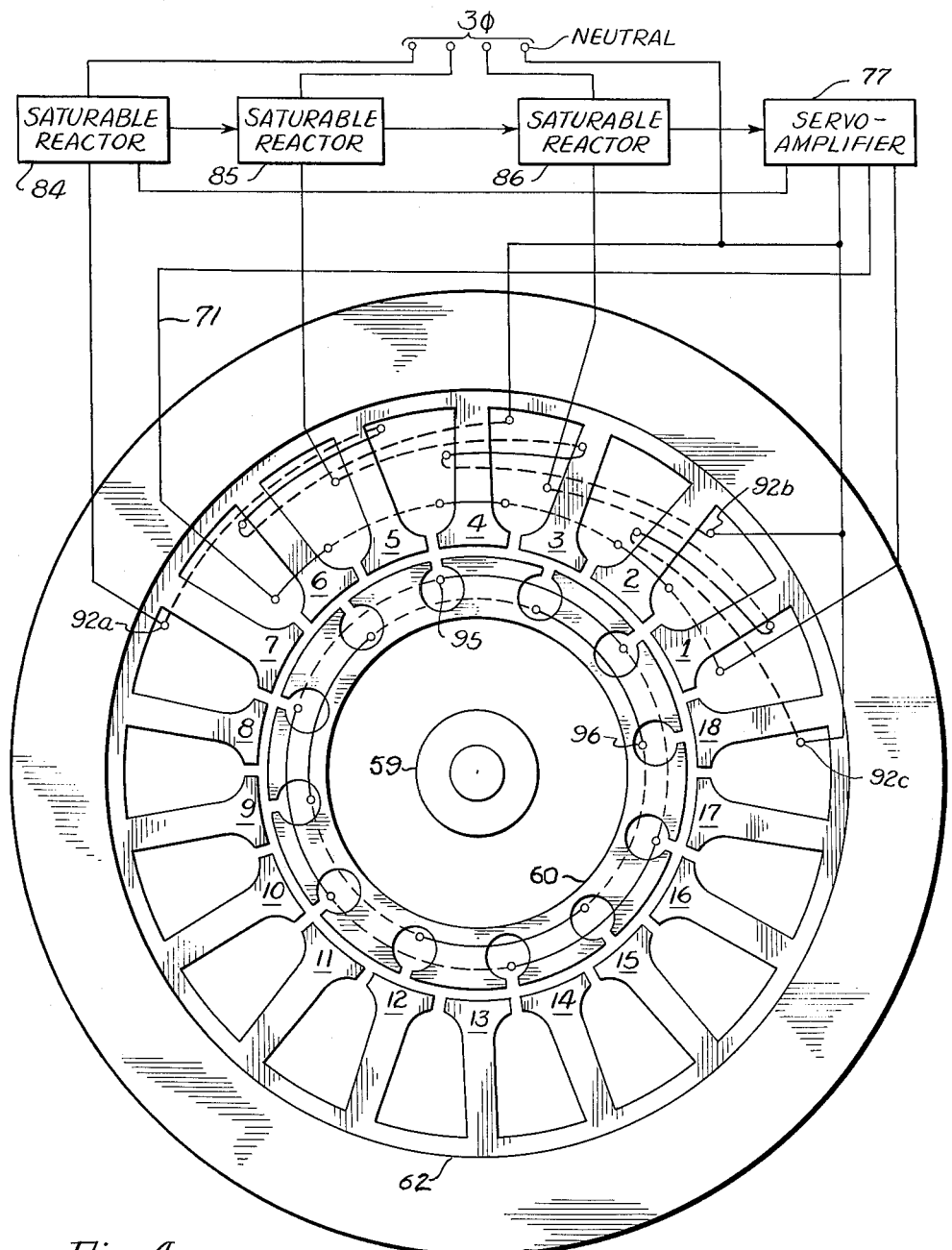
FIG. 4 is an end view of a second embodiment, showing one group of windings on the stator.

With reference to FIG. 4, it is noted that only the single group of motor-control and sensor windings are shown on stator 62. For a complete development of these windings, reference is made to FIG. 5 wherein an end view of poles 1 to 18 of the stator are shown twice, once in solid and once in dotted lines. It will be recalled that the small circles represent windings in slots while the end connectors in front of and behind the poles are represented as solid and dotted lines, respectively.

Sensor winding 70 is alternately wound in front of and behind poles 12 to 7, while sensor windings 71 and 72 are alternately wound in front of and behind poles 6 to 1 and 18 to 13, respectively. Sensor windings 70 to 72 are each positioned across an input of a respective one of the servo amplifiers 76 to 78, which may be similar in construction to the one disclosed by Beams and referred to above in connection with FIG. 1. The output of each amplifier is dependent upon the self-inductance of the associated sensor winding.

Saturable reactors 81 to 83 are connected in a loop across the output of servo amplifier 76. Similarly, saturable reactors 84 to 86 are connected in a loop across the output of servo amplifier 77, and saturable reactors 87 to 89 in a loop across the output of servo amplifier 78.

The motor-control windings are divided into three groups, namely, 91, 92 and 93, mutually spaced 120° around the stator 62, as shown in the development in FIG. 5. Groups 91 to 93 include windings 91a to 91c, 92a to 92c, and 93a to 93c, respectively. The first phase of power supply 94 is applied in parallel through saturable reactors 81, 84, and 87 to the windings 91a, 92a and 93a. The second phase is applied in parallel through reactors 82, 85 and 88 to windings 91b, 92b and 93b, while the third phase is applied in parallel through the reactors 83, 86 and 89 to windings 91c, 92c and 93c.

The self-inductance of each sensor winding 70 to 72 is dependent on the length of the radial air gap adjacent the winding and between rotor 60 and stator 62. The self-inductance of each sensor winding is increased or decreased as the rotor moves toward or away from the winding under consideration. The output of a servo amplifier 76 to 78 is a D.C. signal, having a value that is dependent upon the self-inductance of the associated sensor winding. Each servo amplifier is adjusted so that when the rotor moves closer to the associated winding, the output decreases, and when the rotor moves away from the winding, the output increases.

The voltages applied to motor-control windings 91 to 93 by power supply 94 are amplitude modulated in saturable reactors 81 to 89 by the signals obtained from servo amplifiers 76 to 78. Thus, the magnitude of A.C. current flowing in each group of motor-control windings and the corresponding radial magnetic forces applied to rotor 60 are determined by the amplifier outputs, and the rotor may be magnetically suspended within stator 62 by adjusting the outputs of the amplifiers.

Windings 95, 96 in FIG. 4 are positioned on rotor 60 in a 6-pole, 2-phase configuration. These windings must be insulated from the rotor to prevent the induction of current therein as a result of interaction with the flux created by motor-control windings 91 to 93 and sensor windings 70 to 72. The terminals of each rotor winding 95, 96 are short-circuited on themselves.

The mutual inductance between each group of motor-control windings 91 to 93 and a respective sensor winding 70 to 72 is substantially zero. This will be illustrated by a single example. Sensor winding 71 passes between poles 7 and 6, alternately in front of and behind poles 6 to 1, and between poles 1 and 18, as shown in FIGS. 4 and 5. Motor-control winding 92a passes between poles 7 and 8, behind poles 7 to 5, between poles 4 and 5, in front of poles 5 and 6, behind poles 6 to 4 and, finally, between poles 4 and 3 to neutral. From the position of the windings just described and their symmetrical relationships, it is apparent that the currents induced in the motor-control windings by the flux established by the sensor winding cancel out, and vice versa.

Since rotor windings 95, 96 pass alternately in front of and behind the same number of poles 1' to 18' on rotor 60, the mutual inductances between these windings and the sensor windings 70 to 72 and between these windings and the motor-control windings 91 to 93 are very close to zero. The small coupling between the rotor windings and the sensor windings and between the former windings and the motor-control windings is not sufficiently large to materially affect the operation of the machine.

If, in a particular application, it is desirable to have a mutual inductance between the rotor windings and sensor windings and between these windings and motor-control windings 91 to 93 that has a magnitude closer to zero, one may employ an 18-slot rotor holding windings in a conventional 6-pole, 3-phase configuration.

Rotor 61 and stator 63, not shown, are substantially identical to rotor 60 and stator 62, respectively, and support the same number of windings in the same configuration as the latter, which were just described in detail. The circuits connected between the sensor and motor-control windings positioned on rotor 61 and stator 63 are substantially the same as the one shown in FIGS. 4 and 5 connected between the equivalent windings. For this reason, illustrations of rotor 61 and stator 63 are not presented in the drawings.

Since shaft 59 is both supported and driven from the same power supply 94, special provision must be made for stopping and starting the motor disclosed. If, for example, the power supply is turned off, the magnetic suspension is also turned off while shaft 59 is still running. It is evident, therefore, that an arrangement must be provided for supporting each end of the shaft while it is coasting to rest.

Such an arrangement is shown in FIG. 7. In this figure, spring 100, supported in ring 101, normally urges armature 102, ring 103, and ball bearings 104 against shaft 59. Ring 103 is attached to armature 102 by suitable means, not shown. The armature is part of solenoid 107. When the motor is in operation, switch 108 is closed so that D.C. power supply 109 energizes the solenoid which holds the bearings away from the shaft. When the motor is to be stopped, before power supply 94 is disconnected, switch 108 is opened and solenoid 107 is deenergized to permit spring 100 to urge the ball bearings against the shaft 59, supporting the same.

In operation, before power supply 94 is turned on, switch 108 is opened and shaft 59 is supported by bearings 104. When power supply 94 is applied to motor-control windings 91 to 93, a revolving field is established that induces voltages in rotor windings 95, 96. Currents flow in the rotor windings, and a torque is produced which brings the motor up to speed. The servo amplifiers 76 to 78 are then adjusted so that the magnitude of the A.C. voltages applied to each motor-control winding is such that magnetic fields are established that exert forces on rotors 60, 61 that suspend them within stators 62, 63. Switch 108 is then opened to release ball bearings 104 from shaft 59.

As the shaft rotates, forces resulting from its speed of rotation may be established that displace the shaft from its initial position. When this occurs, the magnitude of the current in each of the motor-control windings 91 to 93 is altered, and the electromagnetic forces established will move the shaft to its initial position.

As an example, assume that rotor 60 is moved downward from its initial, central position in stator 62. The self-inductance of sensor winding 71 will then be decreased, and this in turn will increase the output of servo amplifier 77. As a result, the magnitude of the A.C. voltage applied through saturable reactors 84 to 87 to motor-control windings 92 will be increased. This will increase the force applied to the rotor in the upward direction. Simultaneously, the self-inductances of sensor windings 70, 72 will be increased, and the output of servo amplifiers 76, 78 will be decreased. This in turn will decrease the magnitudes of the A.C. voltages applied to motor-control windings 91 and 93, which decreases the magnitude of the force applied to the rotor in the downward direction. The resultant of the upward and downward forces will restore the rotor to its initial position.

Because rotors 60, 61 are symmetrically misaligned with respect to stators 62, 63, the position of shaft 59 is controlled in the axial direction in substantially the same manner as shaft 13 in FIG. 2 of the first embodiment.

It will be readily apparent to those skilled in the art that the principles described above to modify the first embodiment could be applied equally well to the second embodiment.

What is claimed is:
1. In an electro-mechanical converter;
a rotor positioned in a stator,
a plurality of sensing means for sensing the radial position of said rotor relative to said stator,
a plurality of control windings and a plurality of stator-motor windings positioned on said stator in such a manner that the mutual inductance between each control winding and each stator-motor winding is substantially zero,
a plurality of control means, each connected to the output of a respective one of the sensing means and each providing a signal having a magnitude dependent upon the radial position of the stator relative to said rotor,
means for applying the output of each control means to a respective one of said control windings,
a power supply generating a plurality of voltages in a selected phase relationship, and
means for applying each voltage to a respective one of said stator-motor windings.

2. The converter set forth in claim 1 wherein:
said plurality of sensing means comprises a plurality of sensor windings positioned on said stator in such a manner that the mutual inductance between said sensor windings, stator-motor windings, and control windings is substantially zero.

3. The converter set forth in claim 1 wherein:
a rotor-motor winding positioned on said rotor in such a manner that the mutual inductance between the rotor-motor winding, stator-motor windings and control windings is substantially zero.

4. The converter set forth in claim 1 wherein:
said rotor is a salient pole rotor.

5. In an electro-mechanical converter:
a shaft,
a first and second stator,
a first and second rotor, each positioned on a respective end of said shaft and in a respective one of the stators,
a plurality of first means for sensing the radial position of said first rotor relative to said first stator,
a plurality of first control windings and a plurality of first stator-motor windings positioned on said first stator in such a manner that the mutual inductance between each control winding and each stator-motor winding is substantially zero,
a plurality of first control means, each connected to the output of a respective one of the first sensing means and each providing a signal having a magnitude dependent upon the radial position of said first stator relative to said first rotor,
means for applying the output of each first control means to a respective one of said first control windings,
a plurality of second means for sensing the radial position of said second rotor relative to said second stator,
a plurality of second control windings and a plurality of second stator-motor windings positioned on said second stator in such a manner that the mutual inductance between each second control winding and each second stator-motor winding is substantially zero,
a plurality of second control means, each connected to the output of a respective one of the second sensing means and each providing a signal having a magnitude dependent upon the radial position of said second stator relative to said second rotor,
means for applying the output of each second control means to a respective one of said second control windings,
a power supply generating a plurality of voltages in a selected phase relationship,
means for applying each voltage in a group of said voltage to a respective one of said first stator-motor windings, and
means for applying each voltage in a group of said voltages to a respective one of said second stator-motor windings, 6. The converter set forth in claim 5 wherein:
said first sensing means comprises a plurality of first sensor windings positioned on said first stator in such a manner that the mutual inductance between said first sensor windings, first stator-motor windings and first control windings is substantially zero, and
said second sensing means comprises a plurality of second sensor windings positioned on said second stator in such a manner that the mutual inductance between said second sensor windings, second stator-motor windings and second control windings is substantially zero.

7. The converter set forth in claim 5 including:
a first insulated rotor-motor winding positioned on said first rotor in such a manner that the mutual inductance between the first rotor-motor winding, first stator-motor windings and first control windings is substantially zero, and
a second insulated rotor-motor winding positioned on said second rotor in such a manner that the mutual inductance between the second rotor-motor winding, second stator-motor windings and second control windings is substantially zero.

8. The converter set forth in claim 5 wherein:
the first and second rotors are each a salient pole rotor.

9. The converter set forth in claim 5 wherein:
said first and second rotors are symmetrically misaligned relative to said first and second stators.

10. In an electro-mechanical converter:
a rotor positioned in a stator,
a plurality of sensing means, each sensing the radial position of said rotor relative to said stator,
a plurality of motor-control windings positioned on said stator,
a power supply providing a plurality of voltages in a selected phase relationship,
means for applying each voltage to a respective one of said windings,
a plurality of control means, each connected to the output of a respective one of said sensing means and each providing a signal having a magnitude dependent upon the position of said stator relative to said rotor, and
means connected to each winding for modulating the voltage applied thereto in dependency upon the magnitude of the signal provided by a respective one of said control means.

11. The converter set forth in claim 10 wherein:
said sensing means comprises a plurality of sensor windings positioned on said stator, each sensor winding and a respective motor-control winding being positioned on said stator in such a manner that their mutual inductance is substantially zero.

12. The converter set forth in claim 11 including:
an insulated rotor-motor winding positioned on said rotor in such a manner that the mutual inductance between the rotor-motor winding, the motor-control windings and the sensor windings is substantially zero.

13. The converter set forth in claim 10 wherein said rotor is a salient pole rotor.

14. In an electro-mechanical converter:
a shaft,
a first and second stator,
a first and second rotor, each positioned on a respective end of said shaft and in a respective one of the stators,
first and second means for sensing the position of the first rotor relative to the first stator and the second rotor relative to the second stator, respectively,
first control means, each connected to the output of a respective one of said first sensing means and each providing a signal having a magnitude dependent upon the position of said first rotor relative to said first stator,
second control means, each connected to the output of a respective one of said second sensing means and each providing a signal having a magnitude dependent upon the position of said second rotor relative to said second stator,
a plurality of first motor-control windings positioned on said first rotor,
a plurality of second motor-control windings positioned on said second rotor,
a power supply providing a plurality of voltages in a selected phase relationship,
means for applying each voltage in a group of said voltages to a respective one of said first motor-control windings,
means for applying each voltage in a group of said voltages to a respective one of said second motor-control windings,
means connected to each first motor-control winding for modulating the voltage applied thereto in dependency upon the magnitude of the signal provided by a respective one of said first control means, and
means connected to each second motor-control winding for modulating the voltage applied thereto in dependency upon the magnitude of the signal provided by a respective one of said second control means.

15. The converter set forth in claim 14 wherein:
said first sensing means comprises first sensor windings positioned on said first rotor, each first sensor winding and a respective first motor-control winding being positioned on said first stator in such a manner that their mutual inductance is substantially zero, and
said second sensing means comprises second sensor windings positioned on said second rotor, each second sensor winding and a respective second motor-control winding being positioned on said second stator in such a manner that their mutual inductance is substantially zero.

16. The converter set forth in claim 14 including:
an insulated first rotor-motor winding positioned on said first rotor in such a manner that the mutual inductance between the first rotor-motor, motor-control and sensor windings is substantially zero, and
a second rotor-motor winding positioned on said second rotor in such a manner that the mutual inductance between the second rotor-motor, motor-control and sensor windings is substantially zero.

17. The converter set forth in claim 14 wherein:
said first and second rotors are each a salient pole rotor.

18. The converter set forth in claim 14 wherein:
said first and second rotors are symmetrically misaligned relative to said first and second stators.

References Cited by the Examiner
UNITED STATES PATENTS

| | | | |
|---|---|---|---|
| 2,980,839 | 4/1961 | Haeussermann | 318—138 |
| 3,112,962 | 12/1963 | Lautzenhiser | 308—10 |
| 3,124,962 | 3/1964 | Hirtreiter | 308—10 |
| 3,146,038 | 8/1964 | Lautzenhiser | 308—10 |
| 3,155,437 | 11/1964 | Kinsey | 308—10 |

ORIS L. RADER, *Primary Examiner.*

MILTON O. HIRSHFIELD, *Examiner.*

J. W. GIBBS, *Assistant Examiner.*